No. 737,451. PATENTED AUG. 25, 1903.
R. E. NEAL.
SLIDE BUCKLE.
APPLICATION FILED APR. 23, 1903.
NO MODEL.
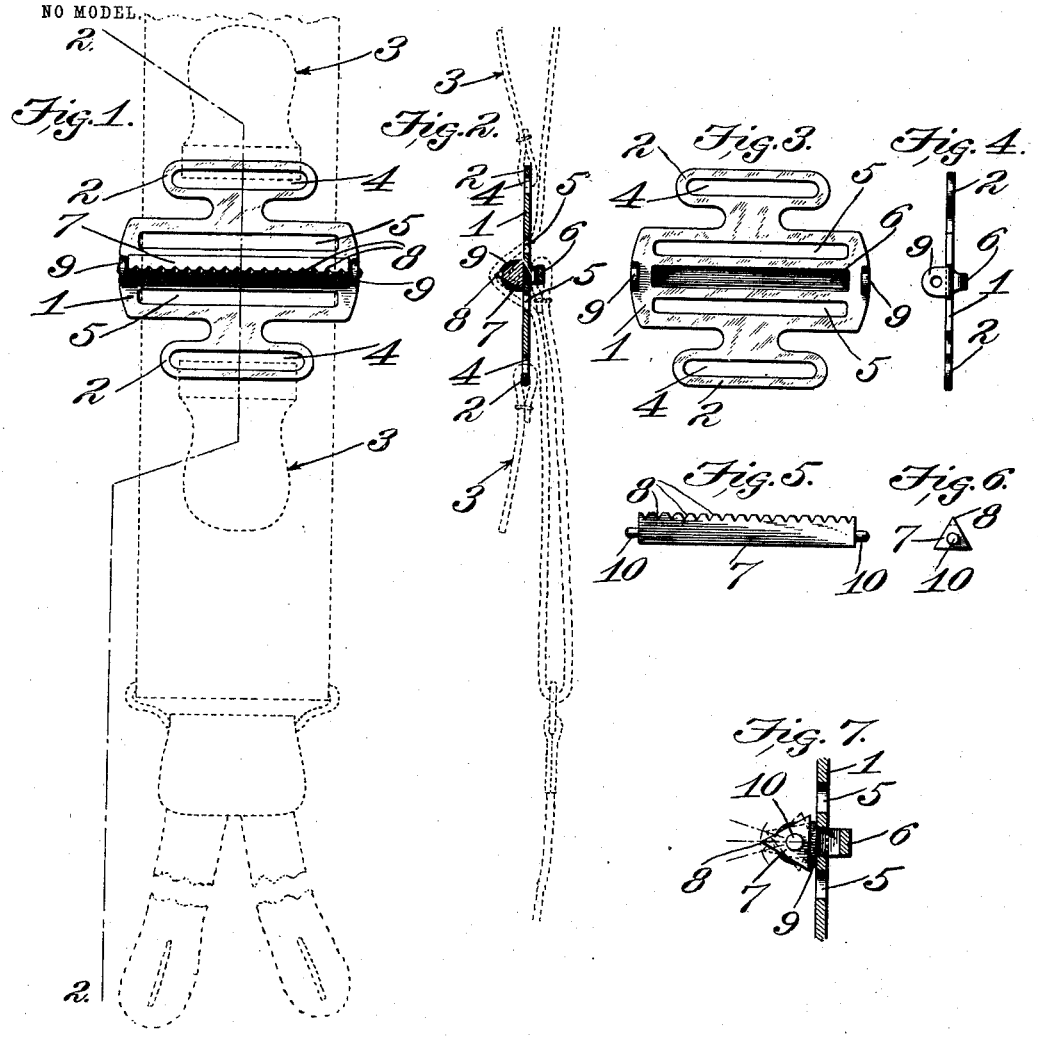
Witnesses:
G. A. Pennington
Frederick H. Gibbs
Inventor:
Russell E. Neal,
by Bakewell & Cornwall
Attys.
THE NORRIS PETERS CO., PHOTO-LITHO., WASHINGTON, D. C.

No. 737,451. Patented August 25, 1903.

UNITED STATES PATENT OFFICE.

RUSSELL E. NEAL, OF ST. LOUIS, MISSOURI.

SLIDE-BUCKLE.

SPECIFICATION forming part of Letters Patent No. 737,451, dated August 25, 1903.

Application filed April 23, 1903. Serial No. 153,990. (No model.)

*To all whom it may concern:*

Be it known that I, RUSSELL E. NEAL, a citizen of the United States, residing at St. Louis, Missouri, have invented a certain new and useful Improvement in Slide-Buckles, of which the following is a full, clear, and exact description, such as will enable others skilled in the art to which it appertains to make and use the same, reference being had to the accompanying drawings, forming part of this specification, in which—

Figure 1 is a view in front elevation of a slide-buckle constructed in accordance with my invention and shown as applied to a piece of suspender-webbing. Fig. 2 is a view in vertical section on the line 2 2 of Fig. 1. Fig. 3 is a detached view of the slide-buckle with the middle ridge removed. Fig. 4 is a corresponding edge view thereof. Fig. 5 is a detached view of the triangular ridge member, hereinafter referred to. Fig. 6 is an end view thereof. Fig. 7 is a vertical sectional view showing the ridge member of Fig. 5 attached to a buckle. Fig. 8 is a front elevational view of a modified form of buckle, and Fig. 9 is a vertical sectional view on line 9 9 of Fig. 8.

My invention relates to an improvement in that class of sheet-metal buckles known as "slide-buckles," the object being to produce at a low cost of manufacture a simple, convenient, and effective slide-buckle constructed with particular reference to the use of elastic or semi-elastic webbing of different thicknesses and adapted to provide an efficient engaging means therefor which will hold the said elastic webbing securely in position when strain is applied to the suspender-webbing and which is so constructed as to permit adjustment thereof along the length of said webbing when required; and it consists in certain details of construction and arrangement of parts, all as hereinafter more fully described, and particularly pointed out in the claims.

Referring to the drawings, 1 is the body portion of a plate or base member formed with an upper and lower finger extension 2, as is common in this class of buckles, to which extensions the tabs 3 (shown in dotted lines in Fig. 1) are attached, said tabs being secured through loops provided by the slots 4 in said finger extensions. Within the body portion of the plate or base member 1, at each side of the middle portion thereof, are parallel transverse slots 5 5, and formed from the metal of the middle portion by being bent downwardly to a lower plane is the web-attaching bar 6, while vertically above said bar 6 is a ridge 7, adapted to provide a frictional engagement with webbing looped through the said slide-buckle, as best shown in dotted lines in Fig. 2, the said webbing passing over the said ridge 7, which may be formed with serrations 8, as shown, or may be merely formed with straight angular edges, as may be desired. Integral with the plate 1 are ears 9, which form pintle-bearings for the pintles 10 of said bar 7 where said bar is made in the form of a separate member and connected with said plate. Where the bar is formed of a separate member and supported in bearings above the plate 1, the lugs 9 may have their bearing in a plane sufficiently elevated to permit slight rocking of the bar 7, if desired, though complete rotation thereof is prevented by means of the angular base of said bar contacting with the plate 1, it being one of the essential features of this invention that said bar or ridge 7 shall be non-revoluble, because it has been found that a freely revoluble or rotary member will not answer the required purpose where elastic webbing is to be used. Hence I prefer in some instances rather than to connect a member 7 with the plate 1 to form said ridge from the metal of the base-plate 1, as best shown in Figs. 8 and 9, wherein the metal 7ª struck from the plate 1 to form the slots 5 5 is given a return-bend toward the middle portion of the plate, whereby a ridge transversely disposed is provided extending across the middle portion of the plate above that portion thereof from which the depressed web-attaching bar 6 is formed. It will be observed that the web-attaching bar 6 lies in a plane extending below the plate 1, while the ridge referred to is substantially vertically above said bar and extends to a plane above the plate 1.

The web of the suspender passes through the slots 5 5 and over the centrally-disposed friction-ridge in such relation thereto that strain on the suspender-web will cause said web to be projected into frictional engagement with said ridge. It will be noted that the inclined faces of the ridge present a smooth surface to the web of the suspender passing thereover in either direction, which web is held only by the apex of the ridge, said ridge being either serrated or plain, as may be desired. The bar 6 being projected to a plane away from the plate or base member leaves an opening between the same and the base member through which the suspender-web is projected, after which said web is secured upon said bar 6 in any desired manner, such as sewing, &c.

I am aware that minor changes in the construction, arrangement, and combination of the several parts of my device can be made and substituted for those herein shown and described without in the least departing from the nature and principle of my invention.

Having thus described my invention, what I claim as new, and desire to secure by Letters Patent, is—

1. In a suspender-buckle, a base member with transversely-extending slots at each side of a central portion thereof, a web-sustaining bar in a plane below said central portion, said bar being formed therefrom and extending transversely thereof, and an elevated non-revoluble friction-producing ridge above the plane of said base member between said slots; substantially as described.

2. In a slide-buckle, a base member with a transversely-extended slot at each end, a web-sustaining bar extending transversely across the middle portion of said base member, in a plane below the same, and a non-revoluble friction-producing ridge projecting to a plane above the plane of said base member; substantially as described.

3. In a slide-buckle, a base member with a transversely-extended slot at each end, a web-sustaining bar extending transversely across the middle portion of said plate in a plane below the same, between said slots, and a friction-producing ridge vertically above the plane of said bar, said ridge projecting to a plane above said plate; substantially as described.

4. In a slide-buckle, a rigid base member with a plurality of transversely-extended web-openings at each side of the middle portion thereof, a serrated non-revoluble friction-producing ridge above the plane of said middle portion, and a web-attaching means extending in a plane below said base member; substantially as described.

5. In a slide-buckle, a rigid base member with a plurality of transversely-extended web-openings at each side of the middle portion thereof, a web-attaching bar formed from said middle portion and extending in a plane below the same, and a serrated non-revoluble ridge vertically above the plane of said bar; substantially as described.

6. In a slide-buckle, a plate with a plurality of slots at each side of the middle portion thereof, with the material struck from said plate to form the said slots converging to a ridge above a central opening, and an integral bar in a plane below said ridge, said bar being struck from the metal of said plate in forming said central opening; substantially as described.

7. In a slide-buckle, a plate with a plurality of slots at each side of the middle portion, the metal from which is folded toward the middle portion of the plate, and extends transversely thereof to form a ridge, and a web-supporting bar in a plane below said ridge formed from the metal of said plate below the ridge; substantially as described.

8. In a slide-buckle, a plate with a plurality of slots at each side of the middle portion thereof, a web-sustaining bar extending transversely across the middle portion of said plate in a plane below said plate, and a non-revoluble ridge whose apex forms an acute angle extending to a plane above said plate on the side thereof opposite said bar; substantially as described.

9. In a slide-buckle, a plate formed of one piece comprising a web-supporting bar, and a non-revoluble friction-ridge, both said bar and said ridge being integral with said plate and projecting to planes at opposite sides thereof, said plate having parallel slots at each side of the middle portion extending transversely across said plate parallel with said ridge; substantially as described.

10. In a slide-buckle, a plate with parallel transverse slots at each side of the middle portion, an integral web-supporting bar extending in a plane below said plate, and a rockable non-rotatable ridge member supported in a plane above the major portion of said plate on the side thereof opposite said web-supporting bar; substantially as described.

11. In a slide-buckle having a web-guiding passage through the upper and lower portion thereof, a laterally-extending non-revoluble friction-ridge projecting to a plane above that portion of the buckle which surrounds the said web-passages, and web-attaching means projected laterally of said buckle in a plane below the portion thereof surrounding said web-passages, the said ridge and the said web-attaching means being integral; substantially as described.

12. In a slide-buckle, a base member with a transversely-extended opening at each end thereof, a web-attaching means formed from a portion of said base member, between said slots, said means projecting to a plane away from the plane of said base member, and a non-revoluble friction-ridge projecting to a plane away from the plane of said base member and on the side thereof opposite said attaching means; substantially as described.

13. In a slide-buckle, a base member with transversely-extended openings at each end thereof, a web-attaching means formed from the metal of said base member, and projecting to a plane substantially parallel therewith, between said openings, and a non-revoluble friction-ridge projecting from the side of said base member opposite to said web-attaching means, said ridge being located between said openings; substantially as described.

14. In a slide-buckle for use with suspenders, a base member with parallel transverse slots at each side of the middle portion, and having a web-supporting bar extending transversely across the portion thereof between said slots, and a rockable, non-rotatable ridge member supported upon the said base member and extending transversely thereof above said portion between said slots; substantially as described.

In testimony whereof I hereunto affix my signature, in the presence of two witnesses, this 20th day of April, 1903.

RUSSELL E. NEAL.

Witnesses:
WILLIAM H. SCOTT,
FREDERICK H. GIBBS.